United States Patent
Lo et al.

(10) Patent No.: US 9,798,406 B2
(45) Date of Patent: Oct. 24, 2017

(54) TOUCH ELEMENT AND TOUCH DISPLAY MODULE

(71) Applicant: HannsTouch Solution Inc., Tainan (TW)

(72) Inventors: Wei-Jen Lo, Tainan (TW); Hung-Yi Huang, Tainan (TW)

(73) Assignee: HannsTouch Solution Inc., Tainan (TW)

( * ) Notice: Subject to any disclaimer, the term of this patent is extended or adjusted under 35 U.S.C. 154(b) by 142 days.

(21) Appl. No.: 15/047,639

(22) Filed: Feb. 19, 2016

(65) Prior Publication Data

US 2017/0068363 A1    Mar. 9, 2017

(30) Foreign Application Priority Data

Sep. 8, 2015  (CN) .......................... 2015 1 0564681

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01); *G06F 2203/04111* (2013.01)

(58) Field of Classification Search
CPC ...... G06F 3/0412; G06F 3/0416; G06F 3/044; G06F 3/046; G06F 1/3231
USPC ......................................................... 345/174
See application file for complete search history.

(56) References Cited

U.S. PATENT DOCUMENTS

| 9,639,194 B2* | 5/2017 | Lee | G06F 3/0412 |
| 2007/0008299 A1* | 1/2007 | Hristov | G06F 3/0416 345/173 |
| 2010/0149126 A1* | 6/2010 | Futter | G06F 1/3231 345/174 |
| 2010/0194697 A1* | 8/2010 | Hotelling | G06F 3/0412 345/173 |
| 2013/0341651 A1* | 12/2013 | Kim | H01L 31/0232 257/84 |
| 2014/0375570 A1* | 12/2014 | Cok | G06F 3/0416 345/173 |
| 2014/0375590 A1* | 12/2014 | Cok | G06F 3/044 345/174 |
| 2014/0375911 A1* | 12/2014 | Lee | G02F 1/13338 349/12 |
| 2015/0042612 A1* | 2/2015 | Lee | G02F 1/13338 345/174 |

(Continued)

*Primary Examiner* — Fred Tzeng
(74) *Attorney, Agent, or Firm* — JCIPRNET (57) ABSTRACT

A touch sensing device including a substrate, a plurality of first sensing series separated from each other and a plurality of second sensing series separated from each other is provided. The substrate has a first surface and a second surface. The first sensing series are disposed on the first surface. Each of the first sensing series includes a plurality of first sensing pads connected to each other. The second sensing series are disposed on the first surface. Each of the second sensing series includes a plurality of second sensing pads distributed between the first sensing series and a plurality of connection lines connecting the second sensing pads. Each of the connection lines extends along an edge of one of the first sensing series, and each of the connection lines is electrically connected to the second sensing pads located at two opposite sides of the first sensing series.

16 Claims, 7 Drawing Sheets

(56) References Cited

U.S. PATENT DOCUMENTS

| | | | |
|---|---|---|---|
| 2015/0042615 A1* | 2/2015 | Yilmaz | G01D 5/2405 345/174 |
| 2015/0084907 A1* | 3/2015 | Burberry | G06F 3/046 345/174 |
| 2015/0091849 A1* | 4/2015 | Ludden | G06F 3/0412 345/174 |
| 2016/0349890 A1* | 12/2016 | Weng | G06F 3/0412 |
| 2017/0068368 A1* | 3/2017 | Hsiao | G06F 3/0416 |

* cited by examiner

TOUCH ELEMENT AND TOUCH DISPLAY MODULE

CROSS-REFERENCE TO RELATED APPLICATION

This application claims the priority benefit of Chinese application serial no. 201510564681.9, filed on Sep. 8, 2015. The entirety of the above-mentioned patent application is hereby incorporated by reference herein and made a part of this specification.

BACKGROUND OF THE INVENTION

1. Field of the Invention

The invention relates to an electronic element and a display module, and particularly relates to a touch element and a touch display module.

2. Description of Related Art

Many electronic devices (e.g., cell phones, tablet computers, etc.,) are configured with touch elements, so as to make the operating interfaces thereof more user friendly. Generally speaking, based on the sensing methods, the touch elements may be divided into capacitive touch elements, resistive touch elements, surface acoustic wave touch elements, and infrared touch elements. Due to its outstanding sensitivity, the capacitive touch elements are broadly used.

In the conventional technology, a capacitive touch element includes a plurality of first sensing series extending along a direction and a plurality of second sensing series extending along another direction. A plurality of insulating patterns are disposed at positions where the first sensing series and the second sensing series are overlapped, so that the first and second sensing series do not result in a short circuit. However, under such configuration, a sensing array of the capacitive touch element formed of the first sensing series and the second sensing series requires several processes to be completely manufactured. Thus, the manufacturing process of the capacitive touch element is complicated and the manufacturing cost thereof is difficult to reduce.

SUMMARY OF THE INVENTION

The invention provides a touch element and a touch display module having a lost manufacturing cost.

The invention provides a touch element, including a substrate, a plurality of first sensing series separated from each other and a plurality of second sensing series separated from each other. The substrate has a first surface and a second surface opposite to the first surface. The first sensing series are arranged along a first direction and disposed on the first surface. Each of the first sensing series includes a plurality of first sensing pads connected to each other. The second sensing series are arranged along a second direction and disposed on the first surface. Each of the second sensing series includes a plurality of second sensing pads distributed between the first sensing series and a plurality of connection lines connecting the second sensing pads. Each of the connection lines extends along an edge of one of the first sensing series. Each of the connection lines includes a first conductive line and a second conductive line. Each of the first conductive lines and the corresponding second conductive line respectively extend along a side and another side of the first sensing series, and each of the connection lines is electrically connected to the second sensing pads located at the two opposite sides of the first sensing series. The first direction and the second direction intersect each other. The first sensing series and the second sensing series are electrically insulated from each other.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
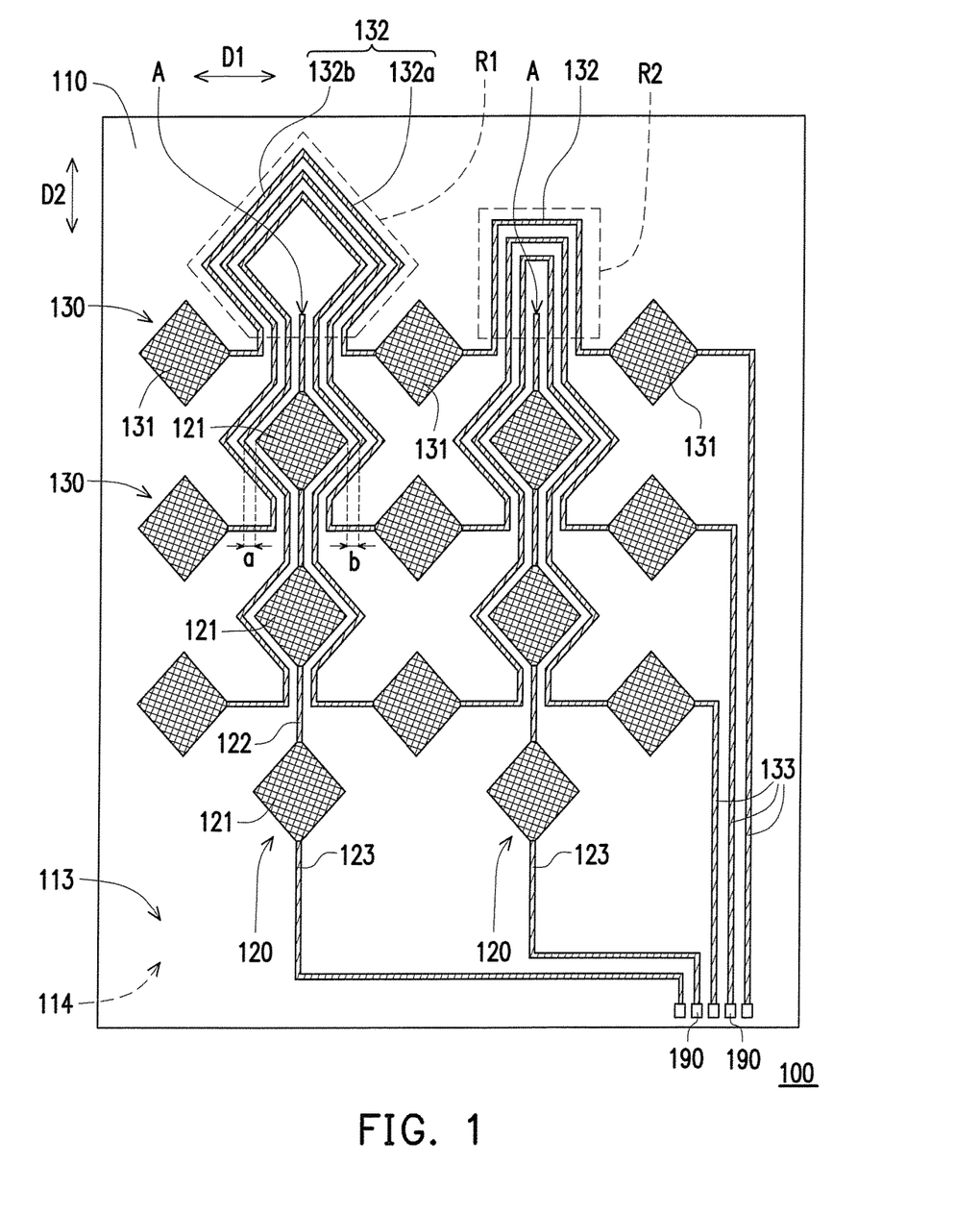
FIG. 1 is a top view illustrating a touch element according to a first embodiment of the invention.

FIG. 1 is a top view illustrating a touch element according to a first embodiment of the invention. Referring to FIG. 1, in this embodiment, a touch element 100 is a single-layer touch panel, for example. The touch element 100 includes a substrate 110, a plurality of first sensing series 120 separated from each other and a plurality of second sensing series 130 separated from each other, and the plurality of first sensing series 120 and the plurality of second sensing series 130 do not overlap with each other. The substrate 110 is a flexible substrate or a rigid substrate, for example, has a first surface 113 and a second surface 114 opposite to the first surface 113. In general, a material of the flexible substrate may include polyimide (PI), polyethylene terephthalate (PET), polyethylene naphthalate (PEN), polyether sulfone (PES), polymethyl methacrylate (PMMA), polycarbonate (PC), or metal foil. A material of the rigid substrate may include glass, quartz, or acrylics.

The first sensing series 120 are disposed on the first surface 113 of the substrate 110 and is arranged in an equidistant interval along a first direction D1. Each of the first sensing series 120 may include a plurality of first sensing pads 121 and a plurality of bridging lines 122 between any adjacent two first sensing pads 121. The any two adjacent first sensing pads 121 may be connected to each other through the corresponding bridging line 122. The second sensing series 130 are disposed on the first surface 113 of the substrate 110 and are arranged in an equidistant interval along a second direction D2 perpendicular to the first direction D1, for example. Each of the second sensing series 130 includes a plurality of second sensing pads 131 distributed between the first sensing series 120 and a plurality of connection lines 132 connecting the second sensing pads 131. In other words, any two sensing pads 131 in any second sensing series 130 are separated from each other by the first sensing series 120.

Besides, each of the connection lines 132 respectively extends along an edge of one of the first sensing series 120, and extends from one side of the first sensing series 120 to another side of the corresponding first sensing series 120, so as to connect the second sensing pads 131 located at two opposite sides of the first sensing series 120. In other words, a wiring direction of each of the connection lines 132 is substantially consistent with a shape of the corresponding first sensing series 120. Thus, the connection lines 132 do not intersect the first sensing series 120. Under the circumstance that the connection line 132 connecting the second sensing pads 131 located at two opposite sides of one of the first sensing series 120 does not cross the first sensing series 120, the touch element 100 of this embodiment has no use for disposing an insulating layer between the first sensing series 120 and the second sensing series 130 for the connection line 132 to cross. In other words, the first sensing series 120 and the second sensing series 130 do not cross each other, but jointly form a single-layer touch sensing circuit. Accordingly, a manufacturing process may be simplified and a manufacturing cost may be reduced. In this embodiment, shapes of the first sensing pads 121 and shapes of the second sensing pads 131 are the same and sizes thereof are equal. However, the invention is not limited thereto.

More specifically, each of the connection lines 132 includes a first conductive line 132a and a second conductive line 132b. Each of the first conductive lines 132a and the corresponding second conductive line 132b are respectively located at two sides of the corresponding first sensing series, respectively extend along one side and the other side of the corresponding first sensing series 120, and are connected to each other at a position adjacent to a terminal A of the corresponding first sensing series 120. In other words, the first conductive lines 132a and the second conductive lines 132b are, for example, symmetrically distributed at two sides of the corresponding first sensing series 120. Namely, the first conductive line 132a and the second conductive line 132b are symmetrically distributed at the left side and right side of the same first sensing series 120. Thus, the connection lines 132 of the same second sensing series 130 have the same length. However, the invention is not limited thereto. In other embodiments, the connection lines 132 of the same second sensing series 130 may have different lengths. Besides, the lengths of the connection lines 132a connecting the second sensing pads 131 relatively away from the terminals A of the first sensing series 120 are greater than the lengths of the connection lines 132 connecting the second sensing pads 131 relatively close to the terminals A of the first sensing series 120.

Wiring directions or expanding paths of the connection lines 132 adjacent to the terminals A of the first sensing series 120 depend on the size of the substrate 110. For example, the extending path of each of the connection lines 132 in a region R1 on the substrate 110 is approximately in a rhombus shape (e.g., an opening pattern in a rhombus shape), while the extending path of each of the connection lines 132 in a region R2 on the substrate 110 is approximately in an inverted U shape (e.g., an opening pattern in a rectangular shape). In other embodiments, the expanding paths of the connection lines in the regions R1 and R2 on the substrate 110 may jointly form a rhombus shape or an inverted U shape. It should be noted that forms of the expanding paths of the connection lines 132 in the regions R1 and R2 on the substrate 110 are not limited to the rhombus shape or the inverted U shape and may also be in an arc shape, a semi-spherical shape, or other polygonal shapes. As shown in FIG. 1, in the region R1 or R2, the connection lines 132 relatively close to the terminals A are surrounded by the connection lines 132 relatively away from the terminals A, and these connection lines 132 keep a pitch therebetween and do not overlap each other. In addition, a pitch a between the first conductive line 132a of each of the connection lines 132 and the corresponding first sensing series 120 in the first direction D1 is equal to a pitch b between the second conductive line 132b of each of the connection lines 132 and the corresponding first sensing series 120 in the first direction D1.

In this embodiment, each of the first sensing series 120 further includes a wiring 123. The wiring 123 extends from the first sensing pad 121 of the first sensing series 120 that is not surrounded by the connection lines 132, and is connected to a metal pad 190 in a peripheral region. In addition, each of the second sensing series 130 further includes a wiring 133. The wiring 133 extends from the second sensing pad 131 at a terminal of the second sensing series 130 and is connected to the metal pad 190 at the peripheral region. It should be noted that the peripheral region is relative to a touch region on the substrate 110 where the first sensing series 120 and the second sensing series 130 are disposed. In addition, the wiring 123 and the wiring 133 are respectively connected to different metal pads 190. As for materials of the first sensing series 120 and the second sensing series 130, the materials of the first sensing pads 121 and the second sensing pads 131 may include metal mesh. Materials of the bridging lines 122, the connection lines 132, and the wirings 123 and 133 may include metal.

In the following, other embodiments are provided for further description. It should be noted that the reference numerals and a part of the contents in the previous embodiment are used in the following embodiments, in which identical reference numerals indicate identical or similar components, and repeated description of the same technical contents is omitted. For a detailed description of the omitted parts, reference can be found in the previous embodiment, and no repeated description is contained in the following embodiments.

Figure 2:
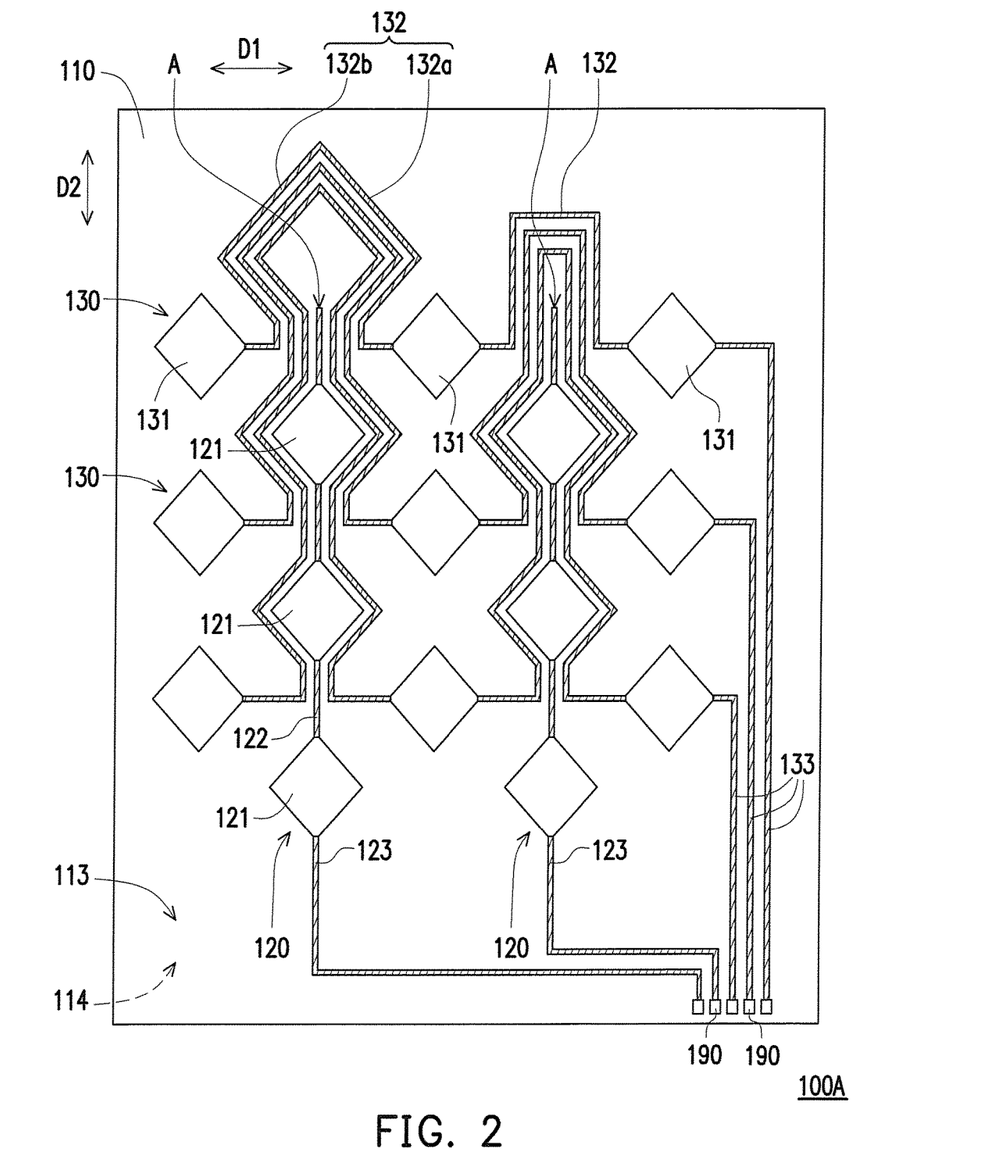
FIG. 2 is a top view illustrating a touch element according to a second embodiment of the invention.

FIG. 2 is a top view illustrating a touch element according to a second embodiment of the invention. Referring to FIG. 2, a touch element 100A of FIG. 2 is substantially similar to the touch element 100 shown in FIG. 1, except for a difference that materials the first sensing pads 121 and the second sensing pads 131 of this embodiment may include transparent conductive oxide, such as ZnO, $In_2O_3$, $SnO_2$, ITO, AZO, GZO, IGZO, or ZTO, and the materials of the bridging lines 122, the connection lines 132, and the wirings 123 and 133 may still include metal.

In other words, based on the manufacturing requirements, the first sensing pads and the second sensing pads of the touch element according to the embodiments of the invention may be formed of metal mesh or transparent conductive oxide. In general, the lines on the substrate are mostly formed of conductive metal or alloy. However, the invention is not limited thereto. In another embodiment, the materials of the first sensing pads 121, the second sensing pads 131, the bridging lines 122, the connection lines 132, and the wirings 123 and 133 may all include transparent conductive oxide.

Figure 3:
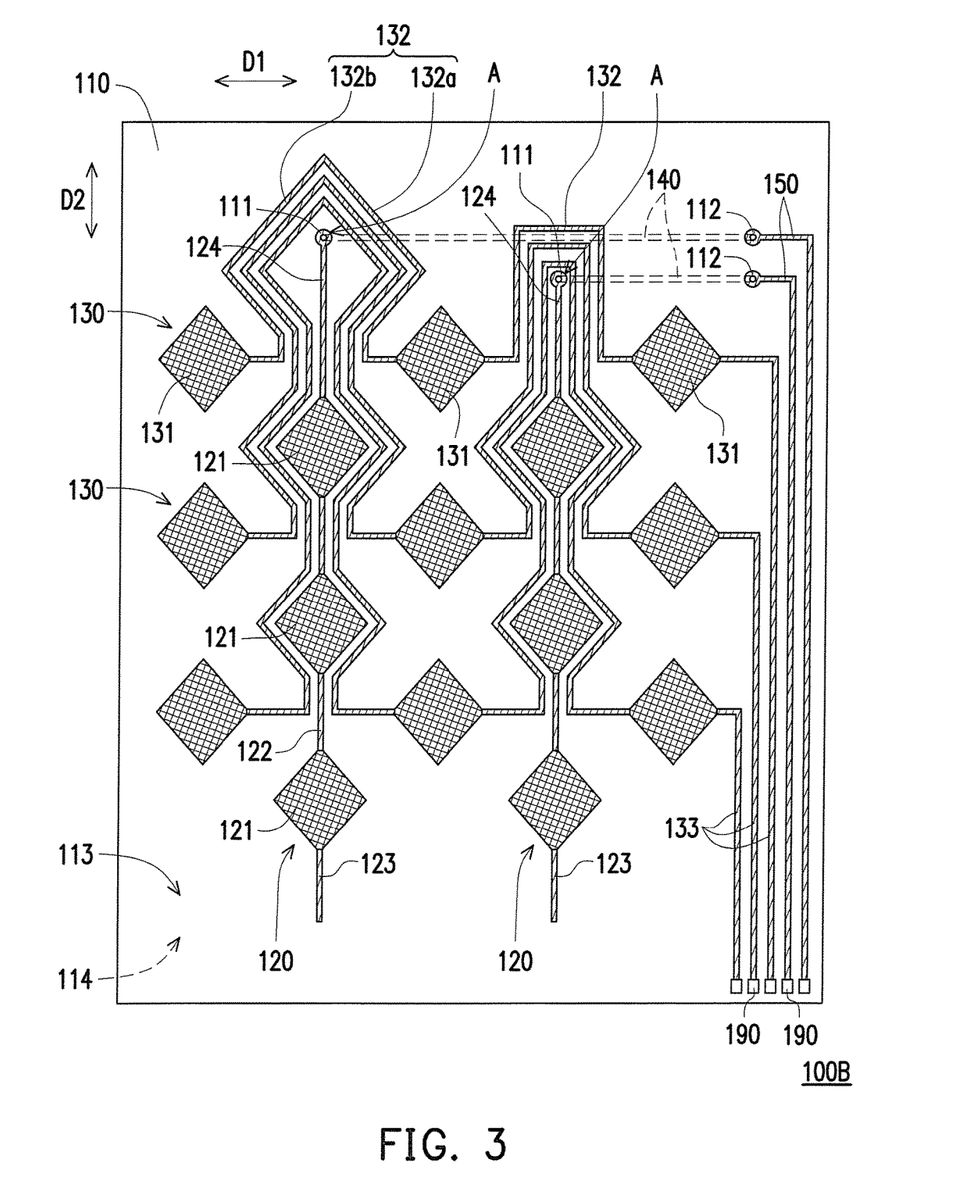
FIG. 3 is a top view illustrating a touch element according to a third embodiment of the invention.

FIG. 3 is a top view illustrating a touch element according to a third embodiment of the invention. Referring to FIG. 3, a touch element 100B shown in FIG. 3 is substantially similar to the touch element 100 shown in FIG. 1, except for a difference that each of the first sensing series 120 further includes a first wiring 124. Each of the first wirings 124 extends from the first sensing pad 121 at the terminal A of the corresponding first sensing series 120 and is surrounded by the connection lines 132 of the second sensing series 130. In addition, different from the first sensing series 120 of the touch element 100 in the first embodiment that are connected to the metal pads 190 in the peripheral region through the wirings 123, the first sensing series 120 of this embodiment are, for example, connected to the metal pads 190 through the first wirings 124, second wirings 140, and third wirings 150.

Specifically, the substrate 110 has a plurality of first conductive through holes 111 and a plurality of second conductive through holes 112. The first conductive through holes 111 are located at the terminals A of the first sensing series 120 and are surrounded by the connection lines 132. The second conductive through holes 112 are located at a side of the connection lines 132 and are not surrounded by the connection lines 132. The touch element 100B further includes the plurality of second wirings 140 and the plurality of third wirings 150. The second wirings 140 and the first wirings 124 as well as the third wirings 150 are located on two opposite sides of the substrate 110. In other words, the first wirings 124 and the third wirings 150 are located on a first surface 113 of the substrate 110, while the second wirings 140 are located on a second surface 115 of the substrate 110.

The second wirings 140 may be conductive lines formed of metal conductive lines or transparent metal oxide (e.g., ITO), and widths of the second wirings 140 may be designed to be greater than widths of the first wirings 124 and widths of the third wirings 150, so as to lower a resistance. For example, the second wirings 140 may be directly formed on the second surface 115 of the substrate 110 by performing a photolithography process. Besides, each of the first wirings 124 extends toward the corresponding first conductive through hole 111, so as to be connected to the corresponding first conductive through hole 111. Each of the second wirings 140 extends from the corresponding conductive through hole 111 toward the corresponding second conductive through hole 112, so as to be connected to the corresponding second conductive through hole 112. Each of the third wirings 150 extends from the second conductive through hole 112, so as to be connected to the metal pad 190 located in the peripheral region.

In other words, the first conductive through holes 111 that penetrate the substrate 110 may serve to connect the first wirings 124 and the second wirings 140, and the second conductive through holes 112 that penetrate the substrate 110 may serve to connect the second wirings 140 and the third wirings 150. In general, the first conductive through holes 111 and the second conductive through holes 112 are filled with a conductive material. Thus, each of the first sensing series 120 may be electrically connected to the metal pad 190 in the peripheral region through the corresponding first wiring 124, the corresponding first conductive through hole 111, the corresponding second wiring 140, the corresponding second conductive through hole 112, and the corresponding third wiring 150.

Figure 4:
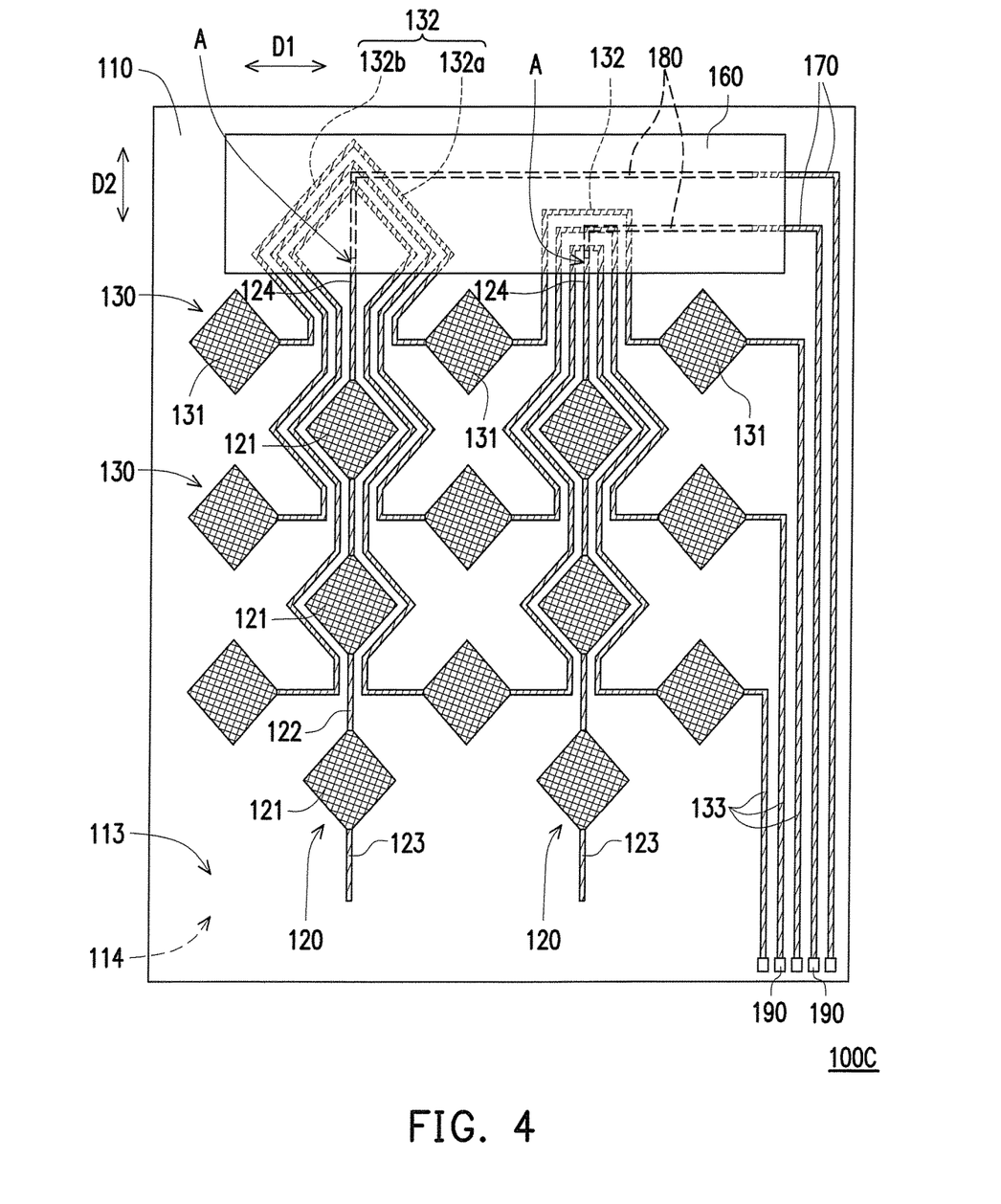
FIG. 4 is a top view illustrating a touch element according to a fourth embodiment of the invention.

FIG. 4 is a top view illustrating a touch element according to a fourth embodiment of the invention. Referring to FIG. 4, a touch element 100C shown in FIG. 4 is substantially similar to the touch element 100, except for a difference that the touch element 100C further includes a flexible circuit board 160. The flexible circuit board 160 is disposed on the first surface 113 of the substrate 110. Namely, the flexible circuit board 160 is disposed on a side of the substrate 110 where the first sensing series 120 and the second sensing series 130 are disposed.

More specifically, the flexible circuit board 160 is located at terminals of the first sensing series 120, and is directly attached to the substrate 110. A patterned circuit 180 is disposed on the flexible circuit board 160. In addition, the flexible circuit board 160 is attached to the first surface 113 of the substrate 110 with a side where the patterned circuit 180 is disposed, for example. In this way, the patterned circuit 180 is electrically connected to the first wirings 124. In addition, the flexible circuit board 160 does not cover the second sensing pads 131 of the second sensing series 130, but partially covers the connection lines 132 connected to the second sensing pads 131. Here, the flexible circuit board 160 is electrically insulated from the connection lines 132. Thus, the flexible circuit board 160 does not affect transmission of sensing signals of the second sensing series 130. For example, an insulating adhesive layer may be disposed between the flexible circuit board 160 and the connection lines 132. The insulating adhesive layer covers the patterned circuit 180 and exposes a portion of the patterned circuit 180, so as to allow the patterned circuit 180 to be electrically connected to the first wirings 124 and the third wirings 170. In addition, the flexible circuit board 160 may be fixed to the substrate 110 through the insulating adhesive layer.

The third wirings 170 are electrically connected to an end of the patterned circuit 180, and the first wirings 124 are electrically connected to another end of the patterned circuit 180. Thus, the first wirings 124 may be electrically connected to the third wirings 170 through the patterned circuit 180 on the flexible circuit board 160, and the third wirings 170 may be further connected to the metal pads 190 in the peripheral region. In other words, each of the first sensing series 120 may be electrically connected to the metal pad 190 located in the peripheral region through the corresponding first wiring 124, the flexible circuit board 160, and the corresponding third wiring 170.

In another embodiment, the flexible circuit board 160 may also be attached to the second surface 115 of the substrate 110 shown in FIG. 3. In addition, the flexible circuit board 160 is attached to the second surface 115 of the substrate 110 with the side where the patterned circuit 180 is disposed, for example, and the patterned circuit 180 may be electrically connected to the first wirings 124 through the first conductive through holes 111 and to the third wirings 150 through the second conductive through holes 112.

Figure 5:
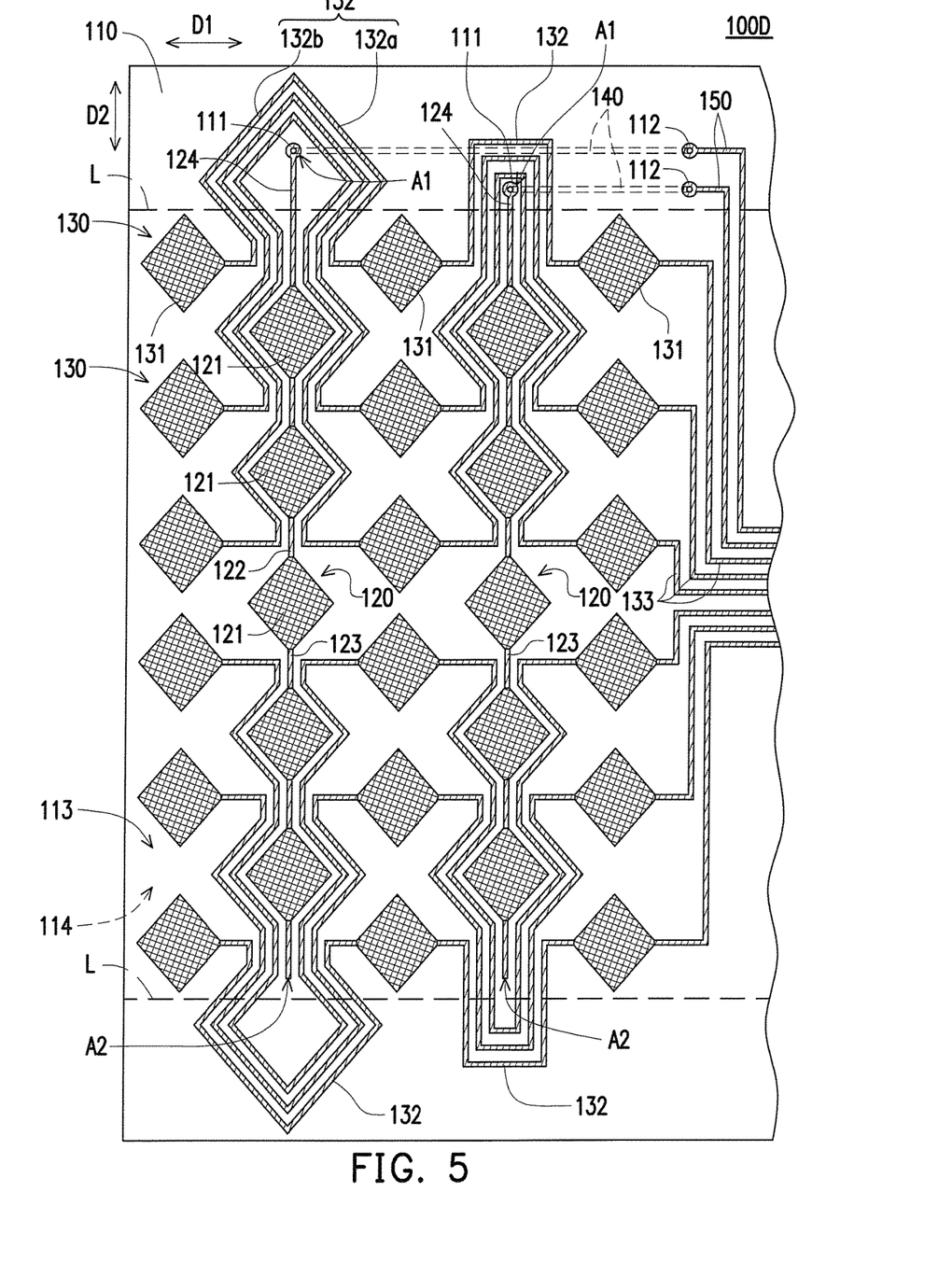
FIG. 5 is a schematic unfolded view illustrating a touch element according to a fifth embodiment of the invention.

FIG. 5 is a schematic unfolded view illustrating a touch element according to a fifth embodiment of the invention. Referring to FIG. 5, a touch element 100D of FIG. 5 is substantially similar to the touch element 100B of FIG. 3, except for a difference that two opposite terminals (e.g., a first terminal A1 and a second terminal A2) of the first sensing series 120 are respectively surrounded by the connection lines 132 connecting the second sensing pads 131 of a part (e.g., an upper part) of the second sensing series 130 and the connection lines 132 of the second sensing pads 131 of another part (e.g., a lower part) of the second sensing series 130. In other words, a part of the connection lines 132 may extend along the edge of the corresponding first sensing series 120 toward a direction where the first conductive through hole 111 is disposed, and go around the first conductive through hole 111 at the first terminal A1 of the corresponding first sensing series 120, so as to connect the second sensing pads 131 at two sides of the corresponding first sensing series 120. Another part of the connection lines 132 may extend along the edge of the corresponding first sensing series 120 in a direction where the first conductive through holes 111 are not disposed, and go around the second terminal A2 of the corresponding first sensing series 120, so as to connect the second sensing pads 131 at two sides of the first sensing series 120. With the configuration, a pitch between the first sensing pad 121 and the second sensing pad 131 is reduced.

Figure 6:
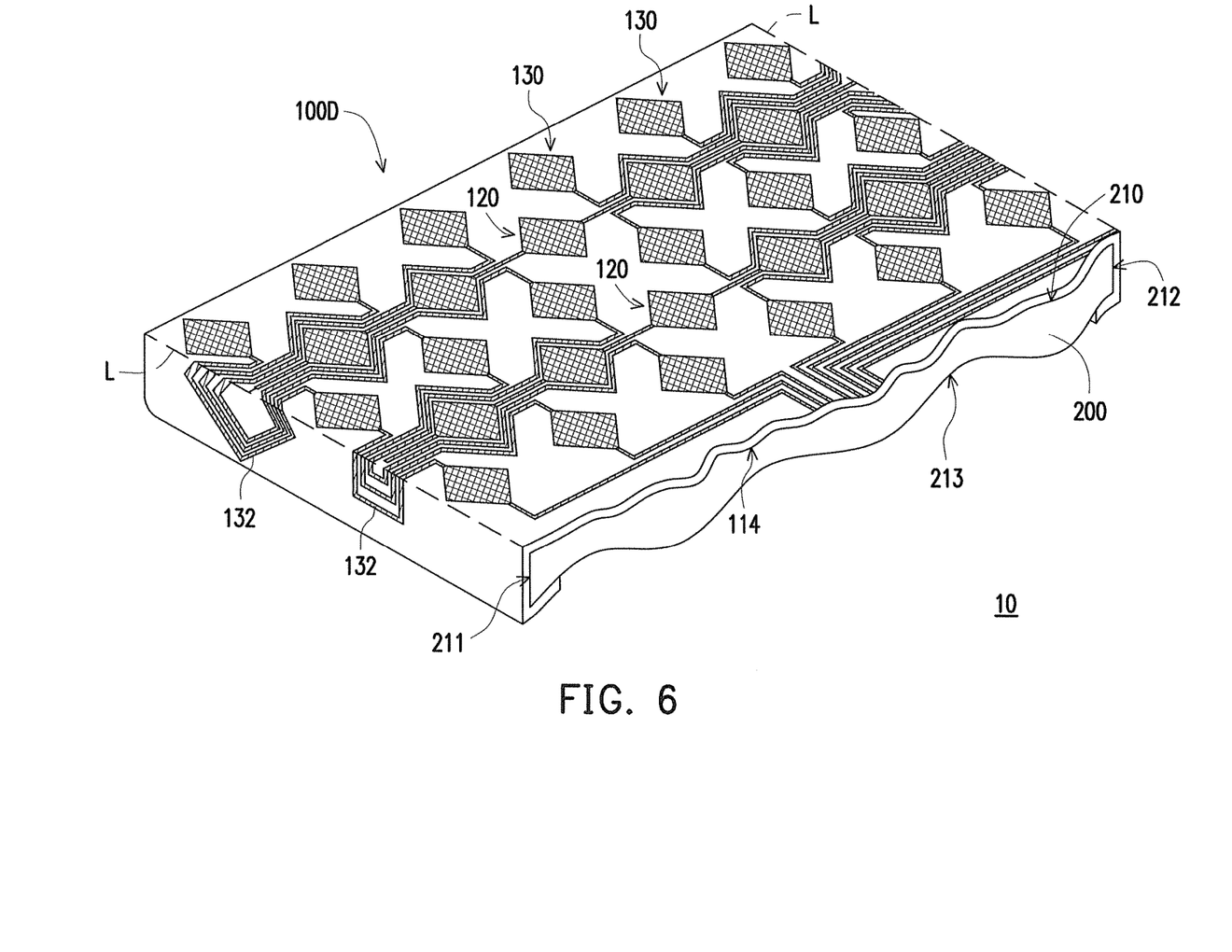
FIG. 6 is a schematic view illustrating a touch display module using the touch element shown in FIG. 5.

FIG. 6 is a schematic view illustrating a touch display module using the touch element shown in FIG. 5. As shown in FIGS. 5 and 6, a touch element 100D may be assembled to a display module 200 (e.g., a liquid crystal display module) to form a touch display module 10. For example, the substrate 110 formed of a flexible material may be bent along a folding line L, so that the second surface 114 of the substrate 110 is attached (or covers) a display surface 210 of the display module, at least two side surfaces 211 and 212 connected with the display surface 210, and a portion of a bottom surface 213 opposite to the display surface 210. The peripheral region of the substrate 110 is attached to the side surfaces 211 and 212 of the display module 200, and the first sensing series 120 and the second sensing series 130 disposed on the substrate 110 are located on the display surface 210, so as to meet a design requirement of slim bezel. Besides, a part of the connection lines 132 are located on the side surfaces 211 and 212.

Figure 7:
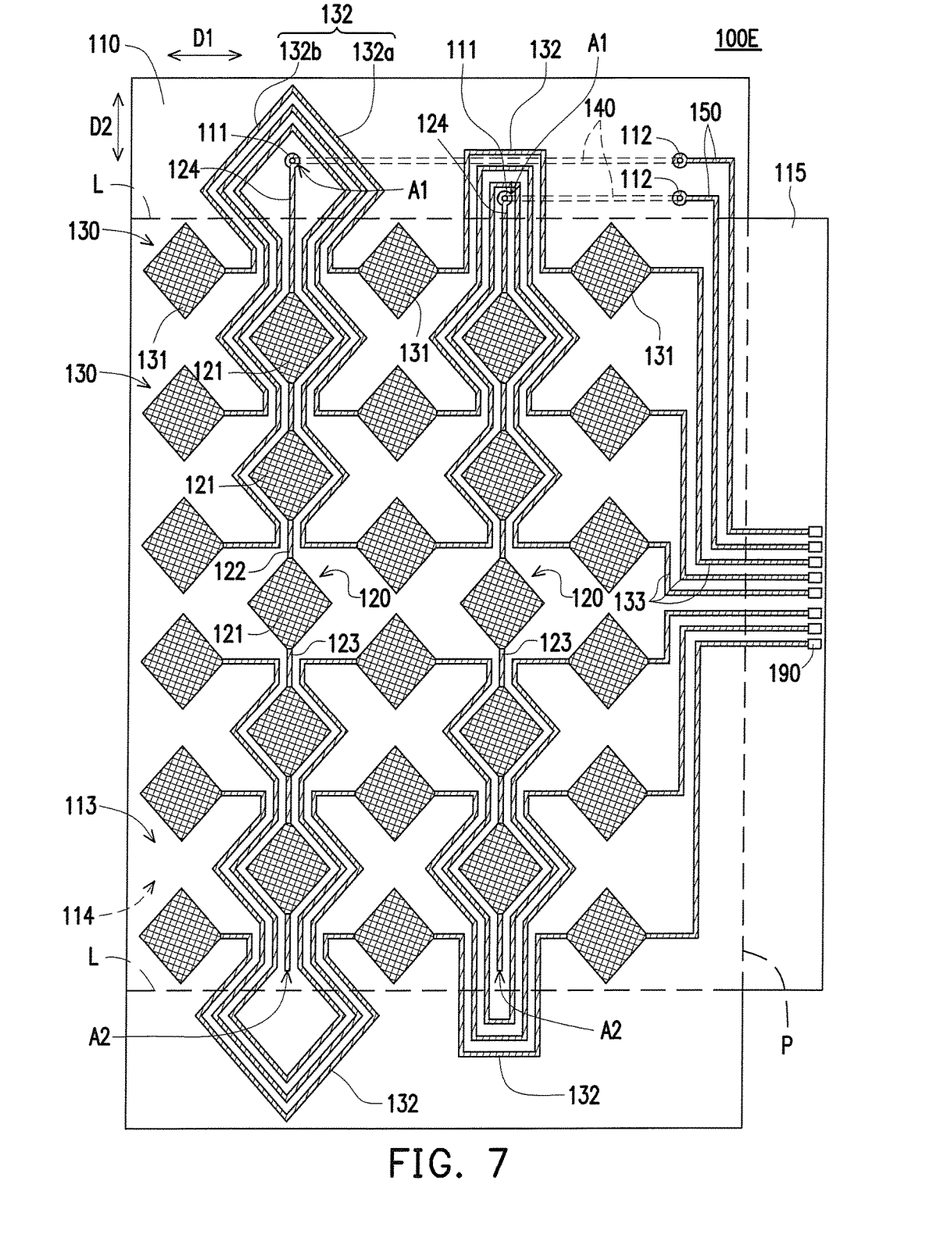
FIG. 7 is a schematic unfolded view illustrating a touch element according to a sixth embodiment of the invention.

FIG. 7 is a schematic unfolded view illustrating a touch element according to a sixth embodiment of the invention. Referring to FIG. 7, a touch element 100E shown in FIG. 7 is substantially similar to the touch element 100D shown in FIG. 5, except for a difference that the substrate 110 of the touch element 100E has an extension part 115. In addition, the extension part 115 is located at a side of the wirings 133 and the third wirings 150, so that the wirings 133 and the third wiring 155 may extend onto the extension part 115. A folding line P is provided between the extension part 115 and the substrate 110. For example, the touch element 100E may be assembled onto the display module 200 (e.g., a liquid crystal display module) to form a touch display module in another configuration. For example, the substrate 110 formed of a flexible material may be bent along the folding lines L and P, so that the peripheral region of the substrate 110 is attached to three sides of the display module 200, and the first sensing series 120 and the second sensing series 130 disposed on the substrate 110 are located on the display surface 210 of the display module 200, so as to meet the design requirement of slim bezel.

In view of the foregoing, in the touch element according to the embodiments of the invention, the second sensing pads located at two sides of the first sensing series are connected through the connection lines extending along the edges of the first sensing series. In other words, the connection lines connecting the second sensing pads at two sides of the first sensing series do not cross the first sensing series. Thus, it has no use for disposing an insulating layer between the first sensing series and the second sensing series for the connection lines to cross. Thus, the manufacturing process of the touch element according to the embodiments of the invention is simplified and the manufacturing cost thereof is reduced as well.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch element, comprising:
   a substrate, comprising a first surface and a second surface opposite to the first surface;
   a plurality of first sensing series, separated from each other, wherein the first sensing series are arranged along a first direction and disposed on the first surface, each of the first sensing series comprises a plurality of first sensing pads connected to each other; and
   a plurality of second sensing series, separated from each other, wherein the second sensing series are arranged along a second direction and disposed on the first surface, each of the second sensing series comprises a plurality of second sensing pads distributed between the first sensing series and a plurality of connection lines connecting the second sensing pads, wherein each of the connection lines extends along an edge of one of the first sensing series and each of the connection lines comprises a first conductive line and a second conductive line, each of the first conductive lines and the corresponding second conductive line respectively extend along a side and another side of the corresponding first sensing series, and each of the connection lines is electrically connected to the second sensing pads located at two opposite sides of the first sensing series, the first direction and the second direction intersect each other, and the first sensing series and the second sensing series are electrically insulated from each other.

2. The touch element as claimed in claim 1, wherein the first conductive line and the second conductive line of each of the connection lines are respectively symmetrically distributed with respect to the corresponding first sensing series.

3. The touch element as claimed in claim 2, wherein a pitch between the first conductive line of each of the connection lines and the corresponding first sensing series in the first direction is equal to a pitch between the second conductive line and the corresponding first sensing series in the first direction.

4. The touch element as claimed in claim 1, wherein the first sensing pads and the second sensing pads have the same shape and size.

5. The touch element as claimed in claim 1, wherein each of the first sensing series further comprises a plurality of bridging lines, and the bridging lines are connected to the first sensing pads.

6. The touch element as claimed in claim 1, wherein the first conductive line and the second conductive line of each of the connection lines are connected to each other at a position adjacent to a terminal of the corresponding first sensing series.

7. The touch element as claimed in claim 1, wherein the connection lines in the same second sensing series have the same length.

8. The touch element as claimed in claim 1, wherein materials of the first sensing pads and the second sensing pads comprise transparent conductive oxide, and a material of the connection line comprises metal.

9. The touch element as claimed in claim 1, wherein each of the first sensing series further comprises a first wiring, and each of the first wirings extends from the first sensing pad at a terminal of the corresponding first sensing series and is surrounded by the corresponding connection line.

10. The touch element as claimed in claim 9, wherein the substrate has a plurality of conductive through holes, the touch element further comprises a plurality of second wirings and a plurality of third wirings, the second wirings are located on the second surface, and the third wirings are located on the first surface,
- a part of the conductive through holes are located at the terminals of the first sensing series, so as to connect the first wirings and the second wirings, and
- another part of the conductive through holes are located at a side of the connection lines, so as to connect the second wirings and the third wirings.

11. The touch element as claimed in claim 10, wherein a width of each of the second wirings is greater than a width of each of the first wirings and a width of each of the third wirings.

12. The touch element as claimed in claim 10, wherein a part of the connection lines are disposed on a side of the substrate where the conductive through holes are disposed and surround a terminal of each of the first sensing series, and another part of the connection lines are located on a side of the substrate where the conductive through holes are not disposed and surround another terminal of each of the first sensing series.

13. The touch element as claimed in claim 9, wherein the substrate has a plurality of conductive through holes, the touch element further comprises a flexible circuit board and a plurality of third wirings, the flexible circuit board is disposed on the second surface and has a patterned circuit, the patterned circuit is located between the flexible circuit board and the substrate, and the third wirings are located on the first surface;
- a part of the conductive through holes are located at the terminals of the first sensing series, so as to connect the first wirings and the patterned circuit,
- another part of the conductive through holes are located at a side of the connection lines, so as to connect the patterned circuit and the third wirings.

14. The touch element as claimed in claim 9, further comprising:
- a flexible circuit board, disposed on the first surface, wherein the flexible circuit board is located at the terminals of the first sensing series, a patterned circuit is disposed on the flexible circuit board, and the patterned circuit is electrically connected to the first wirings and insulated from the second sensing series; and
- a plurality of third wirings, disposed on the first surface, wherein the patterned circuit is electrically connected to the third wirings.

15. The touch element as claimed in claim 14, further comprising:
- an insulating adhesive layer, disposed between the flexible circuit board and the substrate, wherein the insulating adhesive layer covers the patterned circuit and exposes a portion of the patterned circuit to electrically connect the first wirings and the third wirings.

16. A touch display module, comprising:
a display module; and
a touch element, comprising:
- a substrate, disposed on the display module, wherein the substrate comprises a first surface and a second surface opposite to the first surface;
- a plurality of first sensing series, separated from each other, wherein the first sensing series are arranged along a first direction and disposed on the first surface, wherein each of the first sensing series comprises a plurality of first sensing pads connected to each other; and
- a plurality of second sensing series, separated from each other, wherein the second sensing series are arranged along a second direction and disposed on the first surface, wherein each of the second sensing series comprises a plurality of second sensing pads distributed between the first sensing series and a plurality of connection lines connecting the second sensing pads, wherein each of the connection lines extends along an edge of one of the first sensing series and each of the connection lines comprises a first conductive line and a second conductive line, each of the first conductive lines and the corresponding second conductive line respectively extend along a side and another side of the first sensing series, each of the connection lines is electrically connected to the second sensing pads located at two opposite sides of the first sensing series, the first direction and the second direction intersect each other, the first sensing series and the second sensing series are electrically insulated from each other, the second surface is at least attached to a display surface and a side surface of the display module, and a part of each of the connection lines is located on the side surface.

* * * * *